US010962127B2

(12) United States Patent
Gjerde

(10) Patent No.: US 10,962,127 B2
(45) Date of Patent: Mar. 30, 2021

(54) PRESSURE RELIEF VALVE

(71) Applicant: Ventiq AS, Gjerdsvika (NO)

(72) Inventor: Mathias Hogne Gjerde, Gjerdsvika (NO)

(73) Assignee: Ventiq AS, Gjerdsvika (NO)

( * ) Notice: Subject to any disclaimer, the term of this patent is extended or adjusted under 35 U.S.C. 154(b) by 2 days.

(21) Appl. No.: 16/319,374

(22) PCT Filed: Jul. 20, 2017

(86) PCT No.: PCT/NO2017/050197
§ 371 (c)(1),
(2) Date: Jan. 21, 2019

(87) PCT Pub. No.: WO2018/016971
PCT Pub. Date: Jan. 25, 2018

(65) Prior Publication Data
US 2019/0154163 A1 May 23, 2019

(30) Foreign Application Priority Data
Jul. 21, 2016 (NO) .................................. 20161209

(51) Int. Cl.
*F16K 17/26* (2006.01)
*F16K 17/196* (2006.01)
(Continued)

(52) U.S. Cl.
CPC ............ *F16K 17/196* (2013.01); *B65D 90/34* (2013.01); *F16K 17/12* (2013.01); *F16K 17/194* (2013.01);
(Continued)

(58) Field of Classification Search
CPC .... F16K 17/02; F16K 17/196; F16K 27/0263; Y10T 137/774; Y10T 137/779; Y10T 137/86324; Y10T 137/86332
See application file for complete search history.

(56) References Cited

U.S. PATENT DOCUMENTS 5,060,688 A * 10/1991 Sorensen ................ F16K 17/08
137/471
5,607,001 A * 3/1997 Petersen .............. B67D 7/0476
137/599.11
(Continued)

FOREIGN PATENT DOCUMENTS

CN      2881255 Y      3/2007
DE      2051401 B2     2/1976
(Continued)

OTHER PUBLICATIONS

Hagqvist, Astrid, "International Search Report," prepared for PCT/NO2017/050197, dated Oct. 12, 2017, five pages.

*Primary Examiner* — Robert K Arundale
(74) *Attorney, Agent, or Firm* — Shackelford, Bowen, McKinley & Norton, LLP

(57) ABSTRACT

A pressure relief valve to balance the pressure between a cargo tank and the ambient atmosphere is described. The valve is so arranged that the velocity of the out flowing gas jet at no time is under a preset value when the valve is in open position. The valve comprises a valve body (2) designed to act against a valve seat (1) located in a structural outlet (5a) from the cargo tank, which valve body (2) is connected to a rod (7) extending into the structural outlet (5a) opening (5). The rod (7) is being supported and guided by a frame structure (6) extending into the structural outlet (5a) opening (5) and fixed to the structural outlet (5a).

9 Claims, 5 Drawing Sheets

Figure 1:
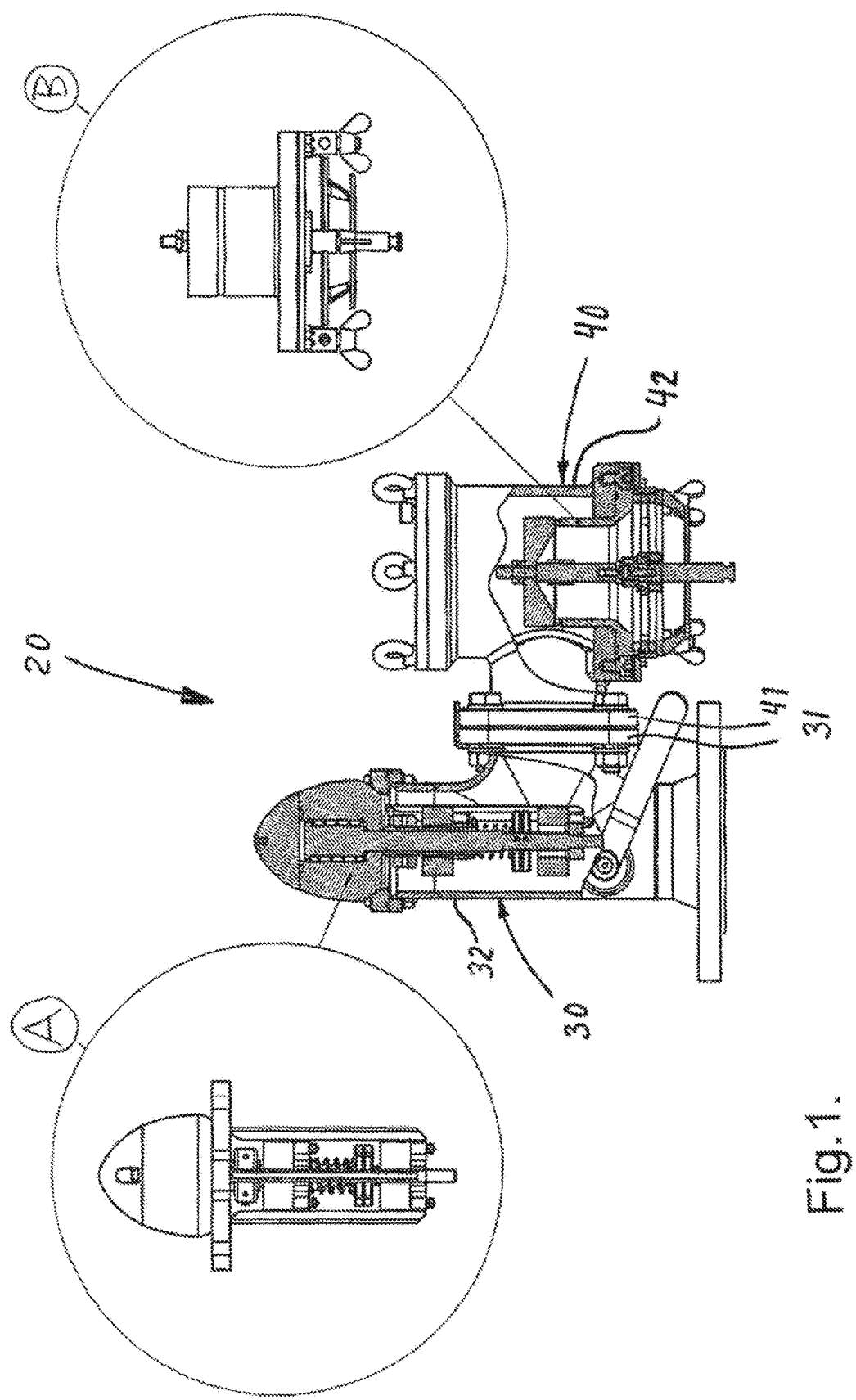

(51) Int. Cl.
   *B65D 90/34*      (2006.01)
   *F16K 31/08*      (2006.01)
   *F16K 17/194*     (2006.01)
   *F16K 24/06*      (2006.01)
   *F16K 17/12*      (2006.01)
   *F16K 24/04*      (2006.01)

(52) U.S. Cl.
   CPC ............. *F16K 24/04* (2013.01); *F16K 24/06* (2013.01); *F16K 31/084* (2013.01); *Y10T 137/7779* (2015.04)

(56) References Cited

U.S. PATENT DOCUMENTS

| | | | | |
|---|---|---|---|---|
| 5,873,384 | A | * | 2/1999 | Pedersen ............... F16K 17/194 137/471 |
| 2004/0177883 | A1 | * | 9/2004 | Sorensen ............... F16K 17/02 137/529 |

FOREIGN PATENT DOCUMENTS

| | | |
|---|---|---|
| EP | 2478279 B1 | 7/2013 |
| KR | 101086639 B1 | 11/2011 |
| KR | 101174654 B1 | 8/2012 |
| WO | WO-9316310 A1 | 8/1993 |
| WO | WO-0075543 A1 | 12/2000 |
| WO | WO-2011032561 A2 | 3/2011 |
| WO | WO-2013068012 A1 | 5/2013 |
| WO | WO-2013083832 A1 | 6/2013 |

\* cited by examiner

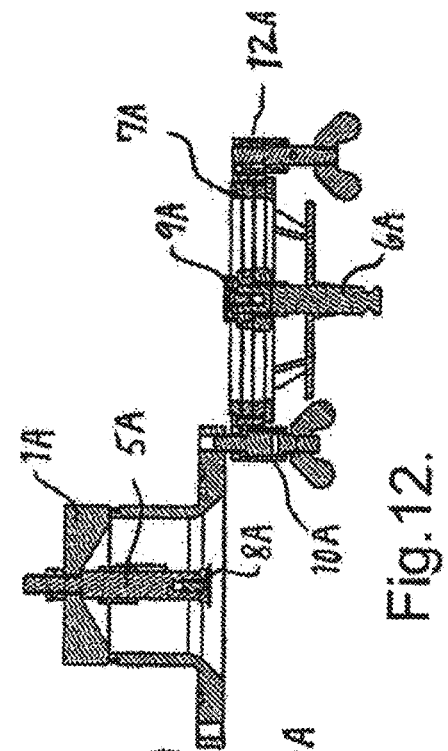
Fig. 10. Fig. 11. Fig. 12.
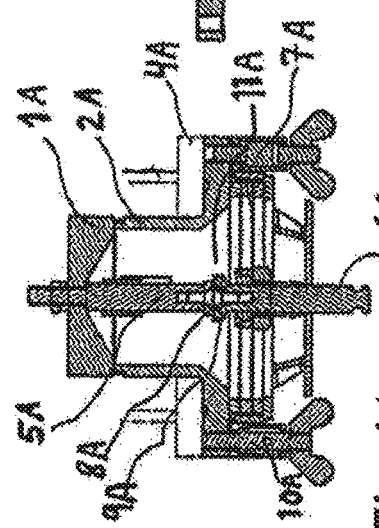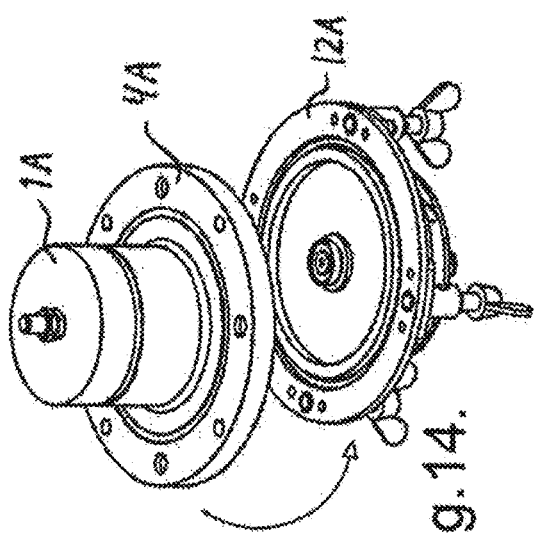
Fig. 13. Fig. 14. Fig. 15.
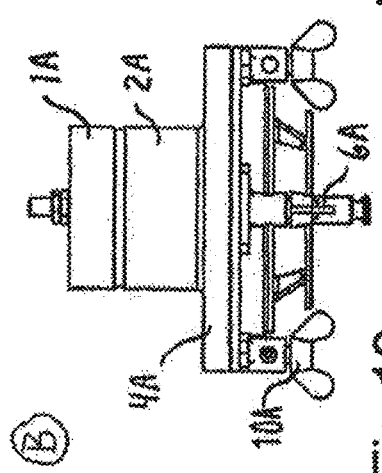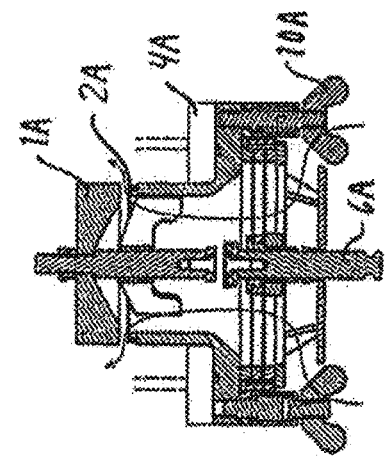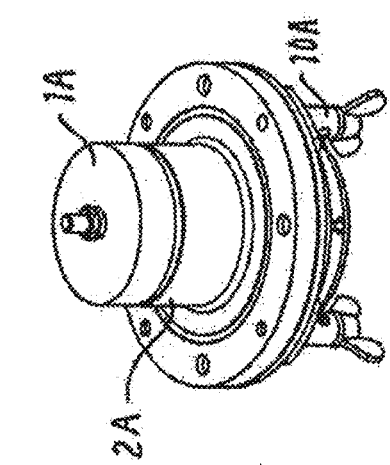

PRESSURE RELIEF VALVE

The present invention relates to a pressure relief valve to balance the pressure between a cargo tank and the ambient atmosphere, the valve being so arranged that the velocity of the out flowing gas jet at no time is under a preset value (normally 30 meters per second) when the valve is in open position. The valve comprises a valve body designed to act against a valve seat located in a structural outlet from the cargo tank, which valve body is connected to a central rod extending into the structural outlet opening, the central rod being supported and guided by a frame structure extending into the structural outlet opening and fixed to the structural outlet.

The present invention relates inter alia to a pressure relief valve for balancing the pressure between a closed space and the ambient atmosphere. In particular, a valve means that functions as a communication between an outer and inner atmosphere. The invention often finds usage for ventilation of cargo tanks on board ships carrying loads from one place to another, but can also be used in onshore tanks where the need for ventilation of pressurized tanks are present.

Known prior art is represented by EP 2478279, WO 2000/075543, WO2013/083832 and WO 2013/068012.

The invention is in particular directed against use on board oil, product and chemical ships in order to balance the over pressure in the cargo tank and as pressure protector during loading and transportation. As an example, when liquid is filled into the cargo tank the pressure will rise and, in respect of a predefined pressure limit, have a need to ventilate the surplus gas that is present above the wet cargo.

Then the invention provides for arranging a vertically outwardly directed gas jet flow from the valve and into the surrounding atmosphere at a velocity, which at no point of time in the opening sequence is below 30 meters per second. The reason for such velocity is bisected. One reason is the need to transport away waste gas such that gas concentrations under the valve and in pockets on the ship deck is avoided. The other reason is as a security measure in the event a fire or spark occur outside the valve and the waste gas from the tank should become ignited. The velocity out from the valve will ensure to keep the flame away from the valve and the corresponding tank in that the flame either is blown out or burns a distance up from the valve head.

Ventilation of waste gases from cargo tanks in tank ships takes place in different environments and the invention takes this in account. As an example, it is often a difference on the abundance ventilation of the tank during a loading situation. Then it can often be a need to perform a full-scale blowout in order to cover the capacity of the area the load pumps displace while during transportation only a need to let out a very limited quantity due to thermal heating of the tank and the medium contained there will be needed. Contrary to ventilation during loading, it is therefore important that the valve during transportation has a function that secure that the valve shuts by the outflow close to a slightly lower pressure than the opening pressure, such that a minimum of the cargo disappears as a result of the opening sequence.

It is known that other valves of this nature opens at a predefined pressure, but in varying degree closes at a low pressure because of the flow dynamics and the air brake effect that is created within the valve. Not only is this influenced on the outflow capacity, but the velocity of the waste gas will also be reduced.

In this part of the invention there is arranged an over pressure valve that has an opening sequence in two distinct different modus. One modus where the opening has a minimum opening area and another that provides maximum opening if the pressure rises above a predefined limit. That modus with minimum opening can be considered as a maintenance ventilation where smaller quantities of waste gases are let out from the tank, i.e. restricts the discharge from the tank to the atmosphere. In connection with transportation of various liquid cargos, the temperature differences during the journey could influence on the cargo such that the cargo expands or retracts in accordance with the change of the external temperature.

If the temperature external to the cargo tank gets high enough, the liquid within the tank will expand such that the pressure rises. The first modus within the valve is the released and a smaller ventilation capacity is released. If the pressure increases beyond the limit to this mentioned maintenance ventilation, it will be a need for more ventilation capacity, and the valve will then lift further and a maximum blowout will take place. If the last modus is effected, it is important that the valve operate at maximum and without restrictions.

In combination with the over pressure valve is used a vacuum relief valve (B) which here is a valve that balances the sub pressure in a closed space and the surrounding atmosphere. Similar to and often in combination with the over pressure relief valve this type of valve is used on ships and land based cargo tanks.

As an example, this is used when the pressure outside the tank is higher than the pressure on the inside. If the pressure increases over a predefined limit the valve is lifted and lets the ambient air enter an internal tank atmosphere.

If the content of the tank is of an inflammable nature, it is necessary to protect this against sparks and fires that might break out outside the tank atmosphere. This is done in that the inlet area of the vacuum relief valve is covered by a suitable flame-arresting device that ensures that no ignited elements is let into the tank. One such known flame arresting device usually consists of two or more layers of mesh of interweaved metal treads which, very randomly spoken, has the ability to let air through, but not flames.

According to the present invention a pressure relief valve of the introductory said kind is provided, which valve is distinguished in that the rod extends into the valve body, which valve body being moveable in respect of the rod and retained in a first position by a spring, which spring counteracts motion of the valve body from the valve seat until a predetermined pressure level within the cargo tank is reached, which pressure level is a threshold value initiating a second valve opening step, the elements providing the second valve opening step includes first and second magnetic structures connected to the valve body and the frame structure respectively, which magnetic structures being designed to attract each other by a preset magnetic force, which preset magnetic force is suspended when said magnetic structures are brought apart by the overpressure within the cargo tank.

In one embodiment, the valve body includes a removable valve head to enable easy access to the head and the spring located therein.

Preferably, the central rod may include a third magnetic structure designed to act against a fourth magnetic structure fixed to the frame structure.

A second spring may act between the frame structure and the third magnetic structure.

As mentioned, the pressure relief valve may also include a second valve, a vacuum relief valve, which valves provides a combined overpressure relief valve with a negative pressure relief valve in one and same unit.

Such negative pressure relieve valve may include a second valve body, a second valve seat, a housing enclosing the valve body and second valve seat, the second valve body rests by gravity on the second valve seat, and together with a guide rod provides for sealing between the housing and a corresponding flange until a pressure outside of the housing increases above an allowed limit and the valve body elevates from the valve seat and balances the pressure within the housing.

The negative pressure relieve valve may include a test rod, which test rod can be pushed vertically upwards in order to check if there is sufficient lift and capacity if the situation that requires negative pressure balancing occurs.

Moreover, the negative pressure relieve valve may preferably include a flame protection element, which element is covered over a structural inlet in order to protect the cargo tank against ingress of sparks/flames.

The test rod may extend through the flame protection element, which test rod is divided from the guide rod and interconnected by including a magnet and a magnetic material arranged on the test rod.

The negative pressure relieve valve may include attachment means to be able to pivot the entire frame structure away from the flange and housing for replacement or cleaning of the flame protecting element.

Also as an individual valve, preferably for use with the mentioned valve, the negative pressure relieve valve may include a second valve body, a second valve seat, a housing enclosing the valve body and second valve seat, the second valve body rests by gravity on the second valve seat, and together with a guide rod provides for sealing between the housing and a corresponding flange until a pressure outside of the housing increases above an allowed limit and the valve body elevates from the valve seat and balances the pressure within the housing.

The negative pressure relieve valve may further include a test rod, which test rod can be pushed vertically upwards in order to check if there is sufficient lift and capacity if the situation that requires negative pressure balancing occurs.

The negative pressure relieve valve may also include a flame protection element, which element is covered over a structural inlet in order to protect the cargo tank against ingress of sparks/flames.

The test rod may extend through the flame protection element, which test rod is divided from the guide rod and interconnected by including a magnet and a magnetic material arranged on the test rod.

Further, the negative pressure relieve valve may include attachment means to be able to pivot the entire frame structure away from the flange and housing for replacement or cleaning of the flame protecting element.

Figure 2:
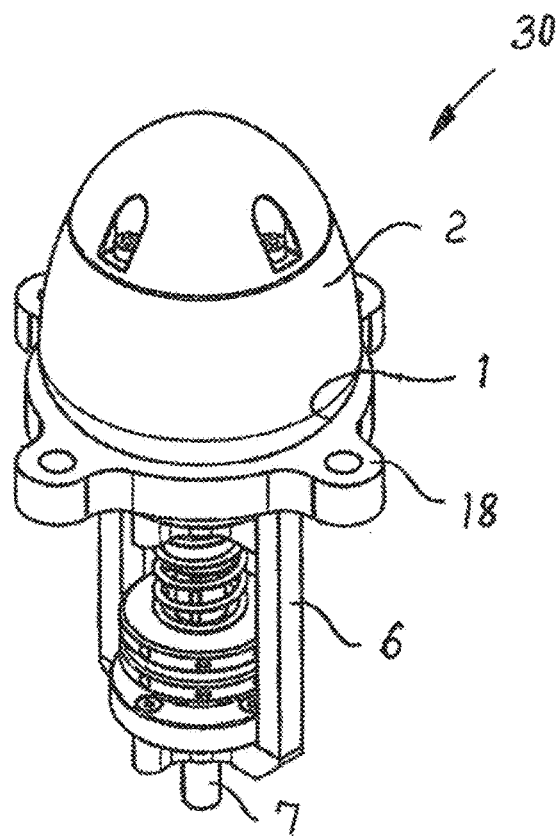
Figure 3:
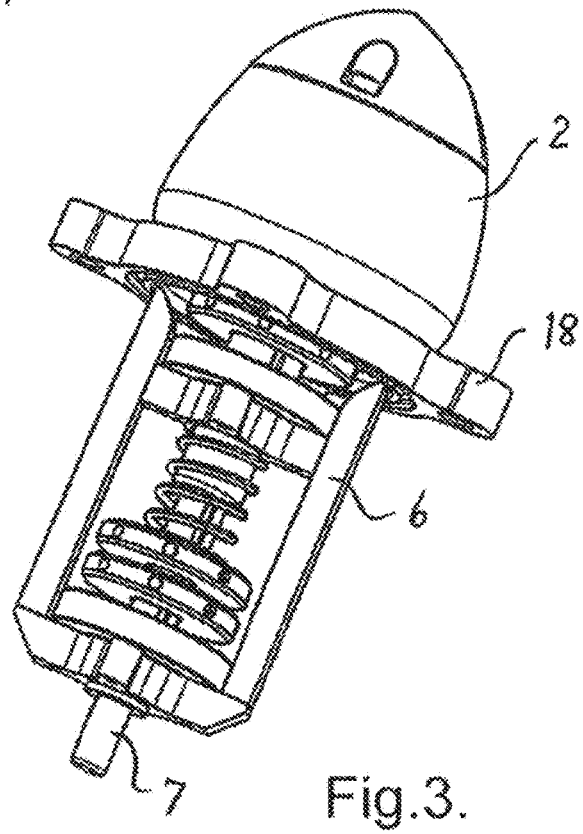
Figure 5:
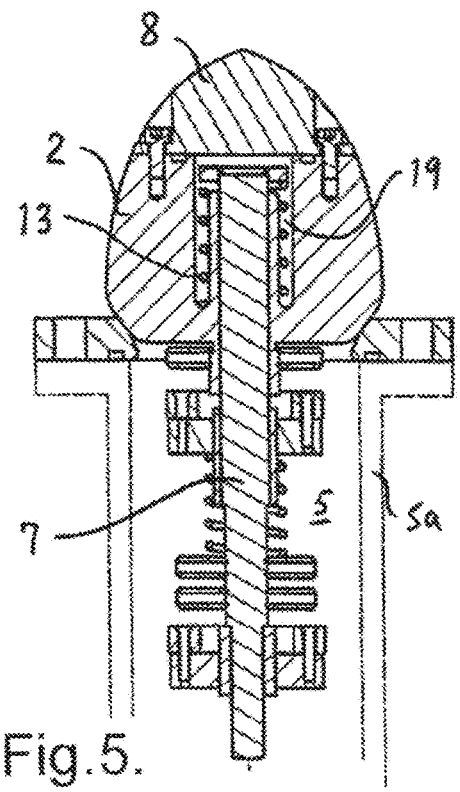
Figure 4:
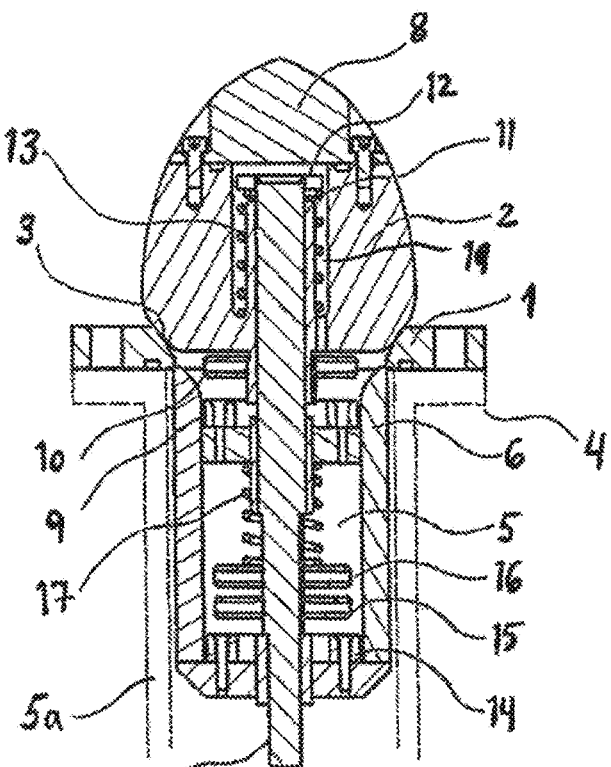
Figure 6:
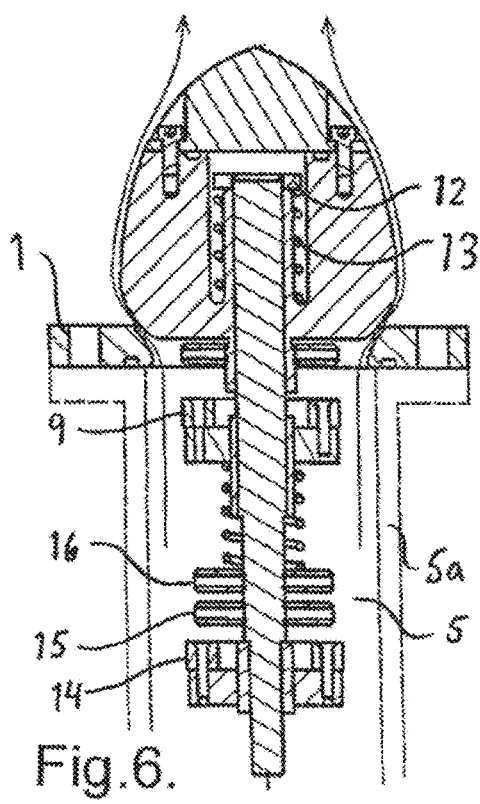
Figure 7:
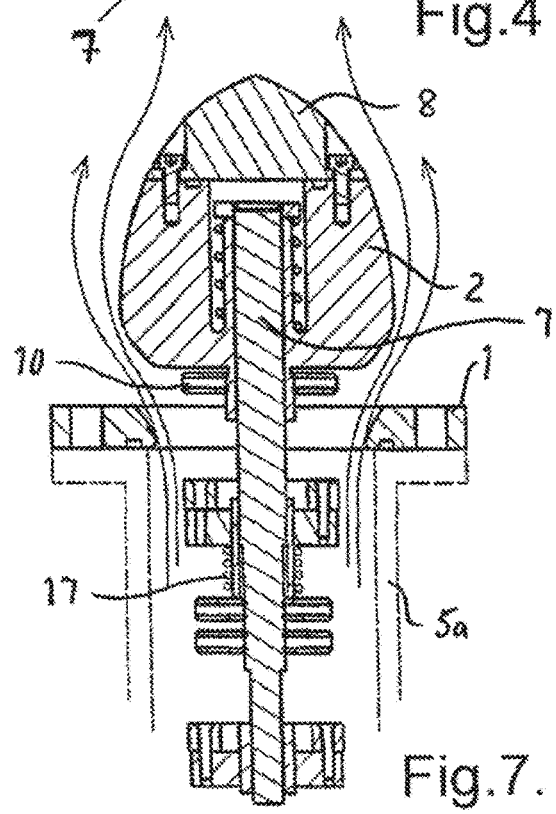
Figure 8:
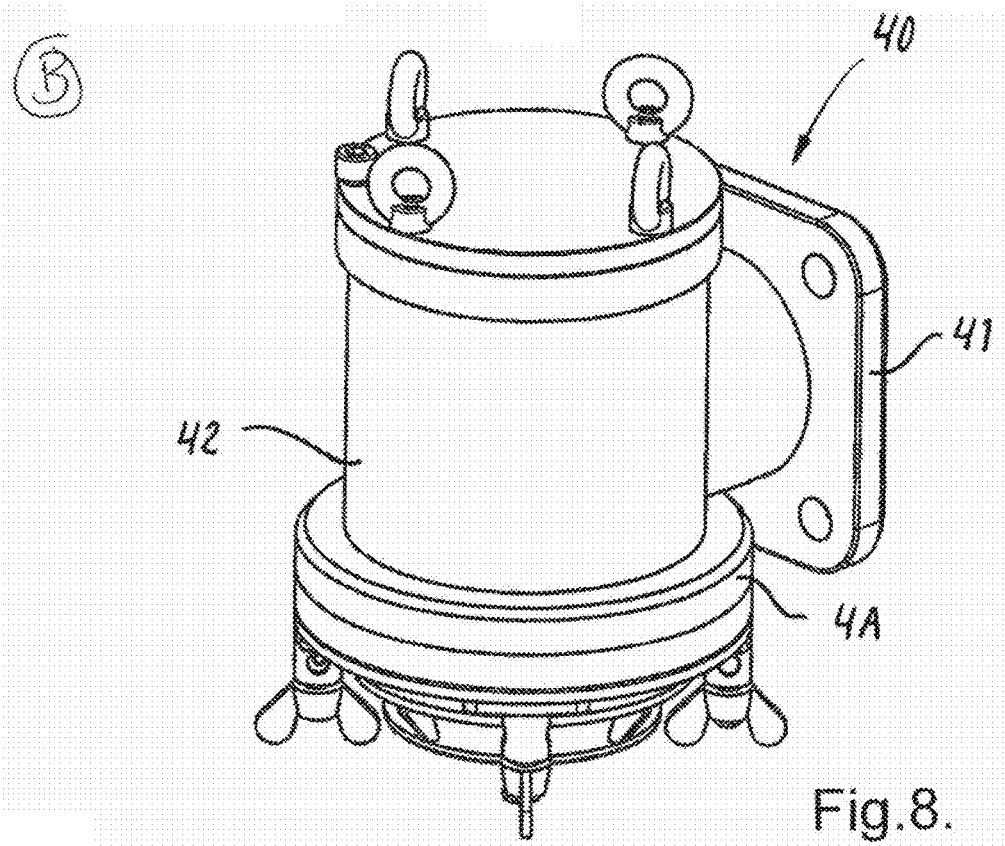
Figure 9:
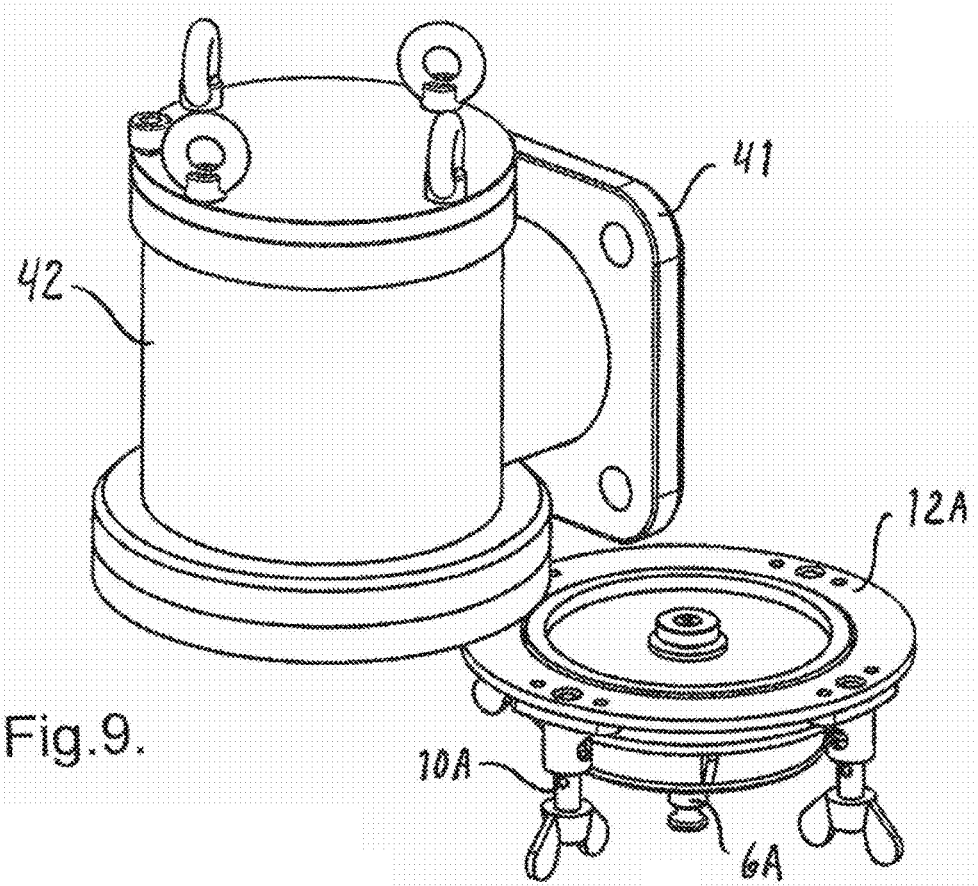

Other and further objects, features and advantages will appear from the following description of preferred embodiments of the invention, which is given for the purpose of description, and given in context with the appended drawings where:

FIG. 1 shows an elevation view of a combined overpressure and negative pressure relief valve according to the present invention, FIG. 2 shows in perspective view from above of the overpressure relief valve separated from the negative pressure relief valve, FIG. 3 shows in perspective view from below the overpressure relief valve shown in FIG. 2, FIG. 4 shows a sectional view of the overpressure relief valve shown in FIGS. 2 and 3, and in a first position when the valve is closed, FIG. 5 shows the same as shown in FIG. 4, but turned 90 degrees about the central longitudinal axis of the valve, FIG. 6 shows the same as FIG. 5, except that the valve body is slightly lifted from the valve seat and lets gas out, FIG. 7 shows the same as FIG. 6, except that the valve body is substantially more lifted off the valve seat, a step two position, FIG. 8 shows a perspective view of the negative pressure relief valve separated from the overpressure relief valve, FIG. 9 shows a perspective view of the negative pressure relief valve as shown in FIG. 8, except that the lower part of the valve is separated from the main part, FIG. 10 shows an elevation view of the negative pressure relief valve separated from the overpressure relief valve and the valve housing, FIG. 11 shows a sectional view of the negative pressure relief valve shown in FIG. 10, and in a closed position, FIG. 12 shows a sectional view of the valve shown in FIG. 11, where the main structural parts are brought apart from each other, FIG. 13 shows a perspective view from above of the negative pressure valve shown in FIG. 10, FIG. 14 shows in perspective view the valve shown in FIG. 13 where the main structural parts are brought apart from each other, and FIG. 15 shows a sectional view of the negative pressure relief valve shown in FIG. 11 in ventilating position.

Reference is first made to FIG. 1 showing a general elevation view of a combined overpressure and negative pressure relief valve 20 according to the present invention. The pressure relief valve 20 is designed to balance the pressure between a cargo tank and the ambient atmosphere.

The pressure relief valve 20 is a unit assembled by an overpressure relief valve 30 and a negative pressure relief valve 40. A housing 32 of the overpressure relief valve 30 provides a structural outlet 5' from a cargo tank (not shown). The housing 32 has a flange 31 adapted to be connected to a flange 41 of a housing 42 of the negative pressure relief valve 40. The respective housings 32, 42 are releasable bolted together via the respective flanges 31, 41.

As shown in more detail in FIGS. 2 and 3, the overpressure relief valve 30 includes a valve body 2 designed to seal against a valve seat 1 provided in a seat ring structure 18. The valve seat 1 is located in a structural outlet 5a from the cargo tank.

With reference to FIGS. 4 to 7, the valve body 2 of the overpressure relief valve 30 is connected to a central rod 7 extending into an opening 5 in the structural outlet 5a. The central rod 7 is in turn supported and guided by a frame structure 6 extending into the opening 5 of the structural outlet 5a and securely fixed to the structural outlet 5a.

The central rod 7 further extends into a cavity 19 of the valve body 2. The valve body 2 is moveable in respect of the rod 7 and retained in a first position by a coil spring 13 and a stop plate 12 secured to the rod 7. The valve body 2 include a central hub structure 11. The internal surface or bore of the hub structure 11 slideably receives the upper part of the rod 7. The coil spring 13 is received in the cavity 19 and the spring 13 surrounds the hub structure 11 and is in this way guided by the hub 11.

The spring 13 is able to counteract a motion of the valve body 2 off from the valve seat 1 until a predetermined pressure level within the cargo tank is reached. Such pressure level is a threshold value that enables initiation of a second valve-opening step.

In this way, the valve is so arranged that the velocity of the out flowing gas jet at no time is under 30 meters per second when the valve is in open position.

As shown in the figures, the valve body 2 of the overpressure relief valve 30 includes a removable valve head 8 to enable easy access to the cavity 19 and the spring 13 and stop plate 12 located in the cavity 19.

The valve body 2 further includes a first magnetic structure 10 located in the bottom of the valve body 2 and is designed to act against a second magnetic structure 9 fixed to the surrounding frame structure 6.

The central rod 7 further includes a third magnetic structure 15, 16 designed to act against a fourth magnetic structure 14 securely fixed to the frame structure 6.

A second spring 17 acts between the frame structure 6 and the third magnetic structure 15, 16.

With reference to FIGS. 4 to 7, the operation of the overpressure relief valve 30 will now be described in detail. In a position of origin, the valve body 2 including the valve head 8 and central rod 7 are retained such that a valve abutment surface 3 of the valve body 2 is seated in the valve seat 1 in the seat ring 18. In this way, the cargo tank pressure is higher than the ambient atmosphere. This pressure difference is achieved by the magnets 9 and 14 are retained towards discs of magnetic material 10, 15, 16 which in turn are securely fixed to the structural frame 6 connected to the valve seat ring 18.

When the cargo tank pressure increases above a predetermined level, the disc 10 will tend to release from the magnet 9 and thus attempt to lift the valve body 2 including the surface 3 up from the valve seat 1, as shown in FIG. 6. However, this motion is stopped by the spring 13 that is activated and compressed against the stop plate 12. The upward motion is then heavy restricted and stopped until a smaller amount of gas is let out.

The cargo tank pressure will after this rise or possibly fall. If the cargo tank pressure decreases, the spring 13 will urge the valve body 2 including the valve surface 3 back against the valve seat 1 and eventually the disc 10 will be activated against the magnet 9, as shown in FIG. 5.

If the cargo tank pressure contrary increases after the spring 13 is urged against the plate stop 12 the motion will provide for that the entire outflow area is exposed in that the disc 15 attempts to move away from the magnet 14 and the center rod 7 including the various associated components are lifted up. A complete exposure of the pressure valve will then take place, as shown in FIG. 7. A softer spring 17 and the spring 13 will, when the pressure decreases, provide for that all components are urged back to a closed condition where no connection between the cargo tank atmosphere and the ambient atmosphere exists, as shown in FIG. 5.

Said in a different way, the present invention has introduced two magnets that releases at different pressures. In addition, the described spring 13, hub 11 and stop plate 12 are introduced, which together increases the pressure above the valve and provides for a higher lift without use of any lift plates or lift rings. In practice, this means that when the first magnet 10 is released, then the hub 11, spring 13 and stop plate 12 provides for that the rod 7 including the third magnet 15, 16 is lifted. Hence a delay in the motion is obtained, which results in a pressure increase over the valve. This provides a very high lift of the pressure valve, when the lift finally appears. This provides that a stability in the valve motion is achieved and any oscillation is avoided. Correspondingly, the same takes place when the valve is about to shut, since the magnets are again put in attraction force, though at different pressure levels.

As already mentioned, the pressure relief valve 20 also includes a second valve, a vacuum, or negative pressure relief valve 40.

Reference is now made to FIGS. 8 and 9 that shows a general perspective view of the negative pressure relief valve 40 separated from the overpressure relief valve 30. The negative pressure relief valve 40 is designed to balance out a possible negative pressure within the cargo tank with the ambient atmosphere.

The negative pressure relief valve 40 is received in the housing 42, which also provides a structural inlet 11A to the cargo tank (not shown). The housing 42 has a flange 41 adapted to be connected to the flange 31 of the housing 32 of the positive pressure relief valve 30. The respective housings 42, 32 are releasable bolted together via the respective flanges 41, 31.

As shown in more detail in FIGS. 10 to 15, the negative pressure relief valve 40 includes a valve body 1A designed to seal against a valve seat 2A' provided in a seat structure 2A. The valve seat 2A' is located in the structural inlet 11A to the cargo tank.

With reference to FIG. 11, the valve body 1A of the negative pressure relief valve 40 is connected to a central guide rod 5A extending into an opening 11' in the structural inlet 11A. The central guide rod 5A is in turn supported and guided by a pivotable frame structure 12 extending into the opening 11' of the structural inlet 11A and securely fixed to the structural inlet 11A.

The invention is operating as follows. The valve body 1A in virtue of its own weight is resting on the valve seat 2A' and together with the guide rod 5A provides for sealing between the housing 42 and corresponding flange 4A until a pressure outside of the housing 42 increases above the allowed limit and the valve body 1A elevates from the valve seat 2A' and balances the pressure within the housing 42.

In order to be able to test the functionality of the negative pressure balancing operation described above, a test rod 6A is introduced, which test rod 6A can be pushed vertically upwards and in this way check if there is sufficient lift and capacity if the situation that requires negative pressure balancing occurs.

In order to protect the cargo tank against ingress of sparks/flames a flame protection element 7A is covered over the structural inlet 11A. The test rod 6A also need to move through the flame protection element 7A. In order to avoid the necessity of very precise centralizing of a collective guiding and test rod, this is divided in a guide rod 5A and a test rod 6A interconnected by a magnet 9A and a magnetic material 8A.

By releasing the entire attachment 10A and pivots the entire frame structure 12A away from the flange 4A and housing 42 for replacement or cleaning of the flame protecting element, an automatic centering and contact will then be obtained when the frame structure 12A is swung back and secures the attachment 10A against the flange 4A.

The invention claimed is:

1. A pressure relief valve to balance the pressure between a cargo tank and the ambient atmosphere, the pressure relief valve being arranged so that the velocity of the out flowing gas jet at no time is under a preset value when the valve is in an open position, the pressure relief valve comprising:
   a valve body designed to act against a valve seat located in an outlet opening structure through which an opening extends from the cargo tank, the valve body is connected to a rod extending into the opening the rod being supported and guided by a frame structure extending into the opening, the frame structure being fixed to the outlet opening structure;

wherein the rod extends into the valve body, the valve body being moveable in respect of the rod and adapted to be retained in a first position by a spring, the spring counteracting motion of the valve body from the valve seat until a predetermined first pressure level within the cargo tank is reached, first and second magnetic structures connected to the valve body and the frame structure respectively, the magnetic structures being configured to attract each other by a preset magnetic force acting in the closing direction the preset magnetic force is overcome when the magnetic structures are brought apart when the pressure in the cargo reaches the predetermined first pressure level, the predetermined first pressure level being a threshold value initiating a first opening modus;

wherein the central rod comprises a third magnetic structure configured to act against a fourth magnetic structure fixedly attached to the frame structure, the third and fourth magnetic structure are configured to attract each other by a preset magnetic force acting in the closing direction and is overcome when the magnetic structures are brought apart when the pressure in the cargo reaches a predetermined second pressure level, the predetermined second pressure level being a threshold value initiating a second valve opening modus; and wherein the predetermined second pressure level is higher than the predetermined first pressure level.

2. The pressure relief valve according to claim 1, wherein the valve body comprises a removable valve head to enable easy access to the spring.

3. The pressure relief valve according to claim 1, wherein a second spring acts between the frame structure and the third magnetic structure.

4. The pressure relief valve according to claim 1, comprising a negative pressure relief valve which provides a combined overpressure relief valve with a negative pressure relief valve in one and same unit.

5. The pressure relief valve according to claim 4, wherein the negative pressure relief valve comprises second valve body, a second valve seat, a housing enclosing the valve body and second valve seat, the second valve body rests by gravity on the second valve seat, and together with a guide rod provides for sealing between the housing and a corresponding flange until a pressure inside of the housing decreases below an allowed limit and the valve body elevates from the valve seat and balances the pressure within the housing.

6. The pressure relief valve according to claim 5, wherein the negative pressure relief valve comprises a test rod, which test rod can be pushed vertically upwards in order to check if there is sufficient lift and capacity if the situation that requires negative pressure balancing occurs.

7. The pressure relief valve according to claim 5, wherein the negative pressure relief valve comprises a flame protection element, which element is covered over a structural inlet in order to protect the cargo tank against ingress of sparks/flames.

8. The pressure valve according to claim 5, wherein the test rod is extended through the flame protection element, which test rod is divided from the guide rod and interconnected by including a magnet and a magnetic material arranged on the test rod.

9. The pressure valve according to claim 1, wherein the negative pressure relief valve comprises attachment means to be able to pivot the entire frame structure away from the flange and housing for replacement or cleaning of the flame protecting element.

* * * * *